US011958203B2

(12) United States Patent
Antkowiak et al.

(10) Patent No.: US 11,958,203 B2
(45) Date of Patent: Apr. 16, 2024

(54) HANDHELD MOTORISED FOOD CUTTING DEVICE

(71) Applicant: BREVILLE PTY LIMITED, Alexandria (AU)

(72) Inventors: Margaret Antkowiak, Bronte (AU); Richard Llewelyn Jones, Hornsby Heights (AU)

(73) Assignee: BREVILLE PTY LIMITED, Alexandria (AU)

( * ) Notice: Subject to any disclaimer, the term of this patent is extended or adjusted under 35 U.S.C. 154(b) by 278 days.

(21) Appl. No.: 17/416,502

(22) PCT Filed: Dec. 16, 2019

(86) PCT No.: PCT/AU2019/051383
§ 371 (c)(1),
(2) Date: Jun. 20, 2021

(87) PCT Pub. No.: WO2020/124133
PCT Pub. Date: Jun. 25, 2020

(65) Prior Publication Data

US 2022/0072728 A1 Mar. 10, 2022

(30) Foreign Application Priority Data

Dec. 21, 2018 (AU) ................................ 2018904903

(51) Int. Cl.
*B26D 3/28* (2006.01)
*B26D 3/26* (2006.01)
*B26D 7/26* (2006.01)

(52) U.S. Cl.
CPC ............... *B26D 3/283* (2013.01); *B26D 3/26* (2013.01); *B26D 7/2628* (2013.01); *B26D 2210/02* (2013.01)

(58) Field of Classification Search
CPC .............. B26D 7/2628; B26D 2210/02; B26D 7/0608; B26D 3/283; B26D 3/26; B26B 25/007
See application file for complete search history.

(56) References Cited

U.S. PATENT DOCUMENTS 4,624,166 A * 11/1986 Kreth .................... B26D 3/283 30/283
2008/0156204 A1 * 7/2008 Cohen .................... B26D 3/283 241/37.5

FOREIGN PATENT DOCUMENTS

CN 102785262 A * 11/2012
CN 102785262 A 11/2012
(Continued)

OTHER PUBLICATIONS

Extended European Search Report (EESR) dated Jul. 18, 2022 for corresponding EP 19898762.0.
(Continued)

*Primary Examiner* — Jonathan G Riley
(74) *Attorney, Agent, or Firm* — TAROLLI, SUNDHEIM, COVELL & TUMMINO L.L.P.

(57) ABSTRACT

A handheld motorised food cutting device (10) is disclosed herein. The handheld motorised food cutting device (10) comprises a body (12) to be gripped in a user's hand so that the device (10) is supported by the hand, the body (12) having a passage (14) extending inwardly of the body (12) from an inlet opening (16) through which a food item to be processed is inserted for movement along the passage (14) in a processing direction (18); a blade assembly (30) moveably mounted in the body (12) for reciprocating movement along a cutting path that is transverse of said processing direction (18), with the blade assembly (30) being exposed to the passage (14) so as to be engaged by the food item moved in said processing direction (18); and a drive assem-
(Continued)

bly (50) to drive said blade assembly (30) along said cutting path, wherein the body (12) provides a surface to abut a palm of said hand, with fingers of the hand extending at least partly about said body so that the body (12) is gripped, and wherein said processing direction (18) is transverse of said surface.

18 Claims, 11 Drawing Sheets

(56) References Cited

FOREIGN PATENT DOCUMENTS

| | | | | | |
|---|---|---|---|---|---|
| CN | 107363878 | A | | 11/2017 | |
| CN | 107363878 | A | | 11/2017 | |
| DE | 102016114619 | A1 | | 2/2018 | |
| DE | 102016114619 | A1 | | 2/2018 | |
| EP | 2415376 | A1 | * | 2/2012 | .............. A47J 43/07 |
| KR | 100853010 | B1 | | 8/2008 | |
| KR | 100853010 | B1 | | 8/2008 | |
| WO | WO-2014096713 | A1 | * | 6/2014 | ............... B26D 3/20 |
| WO | 2015/012549 | A1 | | 1/2015 | |
| WO | WO-2015012549 | A1 | | 1/2015 | |

OTHER PUBLICATIONS

International Preliminary Report on Patentability (IPRP) dated Jun. 16, 2021 for corresponding PCT/AU2019/051383.

International Search Report dated Mar. 5, 2020 for International Application No. PCT/AU2019/051387.

* cited by examiner

HANDHELD MOTORISED FOOD CUTTING DEVICE

FIELD

The present invention relates to food processing, and more particularly to a handheld motorised food cutting device.

BACKGROUND

Handheld food cutting devices such as mandolines are manually operated by a user to produce cut or sliced food items. A conventional mandoline typically includes a frame having a ramp surface and a cutting blade mounted thereon. The user grips the frame with one hand and uses the other hand to slide a food item along the ramp surface until it comes into contact with the cutting blade. The cutting blade then cuts or slices the food item, with the cut or sliced food item falling onto a surface below the mandoline. This sliding movement is repeated back and forth along the ramp surface until the desired number of cut or sliced food is obtained.

The distance between the ramp surface and blade may be varied to obtain cuts or slices of different thicknesses. The blade arrangement may also be modified to obtain different types of cuts or slices, such as juliennes, waffle cuts, or crinkle cuts.

A disadvantage of such conventional mandolines is that the blade is typically exposed and therefore provides easy access to a user's finger. This presents a safety risk for the user. e.g. from accidental cuts to the finger during handling of the mandoline. Additionally, the manual operation of conventional mandolines can be tiresome for the user due to the repeated sliding movement that is required to obtain multiple cuts or slices.

OBJECT OF THE INVENTION

It is the object of the present invention to substantially overcome or at least ameliorate one or more of the above disadvantages, or at least provide a useful alternative.

SUMMARY OF THE INVENTION

There is disclosed herein a handheld motorised food cutting device comprising:

a body to be gripped in a user's hand so that the device is supported by the hand, the body having a passage extending inwardly of the body from an inlet opening through which a food item to be processed is inserted for movement along the passage in a processing direction;

a blade assembly moveably mounted in the body for reciprocating movement along a cutting path that is transverse of said processing direction, with the blade assembly being exposed to the passage so as to be engaged by the food item moved in said processing direction; and a drive assembly to drive said blade assembly along said cutting path, wherein the body provides a surface to abut a palm of said hand, with fingers of the hand extending at least partly about said body so that the body is gripped, and wherein said processing direction is transverse of said surface.

Preferably, the processing direction is inclined to said surface by an angle of between 70 degrees to 110 degrees.

Preferably, the angle is between 80 degrees to 100 degrees.

Preferably, the angle is about 90 degrees.

Preferably, the body has an outlet passage extending from the blade, whereby cut food passes from the blade along the outlet passage to an outlet opening in an outlet direction.

Preferably, said outlet direction is transverse of the processing direction.

Preferably, the outlet direction is at an angle of between 70 degrees to 110 degrees of said processing direction.

Preferably, the outlet direction is at an angle of between 80 degrees to 100 degrees of said processing direction.

Preferably, the outlet direction is at an angle of about 90 degrees of said processing direction.

Preferably, the blade assembly includes a blade carrier adapted to hold a blade and a blade cartridge having a support surface for the food item.

Preferably, the blade is moveably mounted in the blade carrier.

Preferably, the blade is moveable with respect to the blade cartridge along the processing direction.

Preferably, the blade cartridge includes a plurality of articulated links to enable curvilinear movement of the blade cartridge.

Preferably, the device further includes an ejector member mounted to the blade carrier to aid in ejecting or removing cut food items.

Preferably, the drive assembly includes a motor having an output shaft connected to a yoke plate, the output shaft being rotatably driven to drive rotation of the yoke plate, and rotation of the yoke plate drives the movement of the blade assembly along the cutting path.

Preferably, the device further includes at least one switch to enable operation of the drive assembly, the switch being positioned at a predetermined distance from the surface of the body that abuts the palm.

Preferably, the device further includes a tilt orientation sensor operatively associated with the drive assembly.

Preferably, the device further includes a support stand mounted to the body.

There is also disclosed herein a handheld motorised food cutting device comprising:

a body to be gripped in a user's hand so that the device is supported by the hand, the body having a passage extending inwardly of the body from an inlet opening through which a food item to be processed is inserted for movement along the passage in a processing direction;

a blade assembly moveably mounted in the body for reciprocating movement along a cutting path that is transverse of said processing direction, with the blade assembly being exposed to the passage so as to be engaged by the food item moved in said processing direction; and a drive assembly to drive said blade assembly along said cutting path, wherein the body has an outlet passage extending from the blade to an outlet opening in an outlet direction, and wherein the outlet direction is transverse of the processing direction.

Preferably, the processing direction is inclined to said surface by an angle of between 70 degrees to 110 degrees.

Preferably, the angle is between 80 degrees to 100 degrees.

Preferably, the angle is about 90 degrees.

Preferably, the cutting path is transverse relative to said processing direction.

Preferably, the cutting path is inclined in the processing direction by an angle of between 70 degrees to 110 degrees.

Preferably, the angle is between 80 degrees to 100 degrees.

Preferably, the angle is about 90 degrees.

There is disclosed herein a handheld motorised food cutting device comprising:

a body to be gripped in a user's hand so that the device is supported by the hand, the body having a passage extending inwardly of the body from an inlet opening through which a food item to be processed is inserted for movement along the passage in a processing direction;

a blade assembly moveably mounted in the body for reciprocating movement along a cutting path that is transverse of said processing direction, with the blade assembly being exposed to the passage so as to be engaged by the food item moved in said processing direction; and a drive assembly to drive said blade assembly along said cutting path, wherein the blade assembly includes a blade carrier adapted to hold a blade and a blade cartridge having a support surface for the food item, the blade carrier being moveable along the cutting path, and wherein the blade is moveably mounted in the blade carrier and moveable with respect to the blade carrier along the processing direction such that the blade moves along the processing direction whilst the blade carrier moves along the cutting path.

There is disclosed herein a handheld motorised food cutting device comprising:

a body to be gripped in a user's hand so that the device is supported by the hand, the body having a passage extending inwardly of the body from an inlet opening through which a food item to be processed is inserted for movement along the passage in a processing direction;

a blade assembly moveably mounted in the body for reciprocating movement along a cutting path that is transverse of said processing direction, with the blade assembly being exposed to the passage so as to be engaged by the food item moved in said processing direction; and a drive assembly to drive said blade assembly along said cutting path, wherein the body provides a surface to abut a palm of said hand, with fingers of the hand extending at least partly about said body so that the body is gripped, and wherein said processing direction is transverse of the cutting path.

Preferably, said body has a longitudinal length extending generally transverse of said processing direction, a width transverse of said processing direction and said longitudinal length, and a depth transverse of said longitudinal length and width, with said surface having said width so that the body fits in the user's hand so that the device can be lifted and supported by the user's hand.

BRIEF DESCRIPTION OF THE DRAWINGS

Preferred forms of the present invention will now be described by way of example only, with reference to the accompanying drawings, in which.

DETAILED DESCRIPTION OF THE EMBODIMENTS

Figure 1:
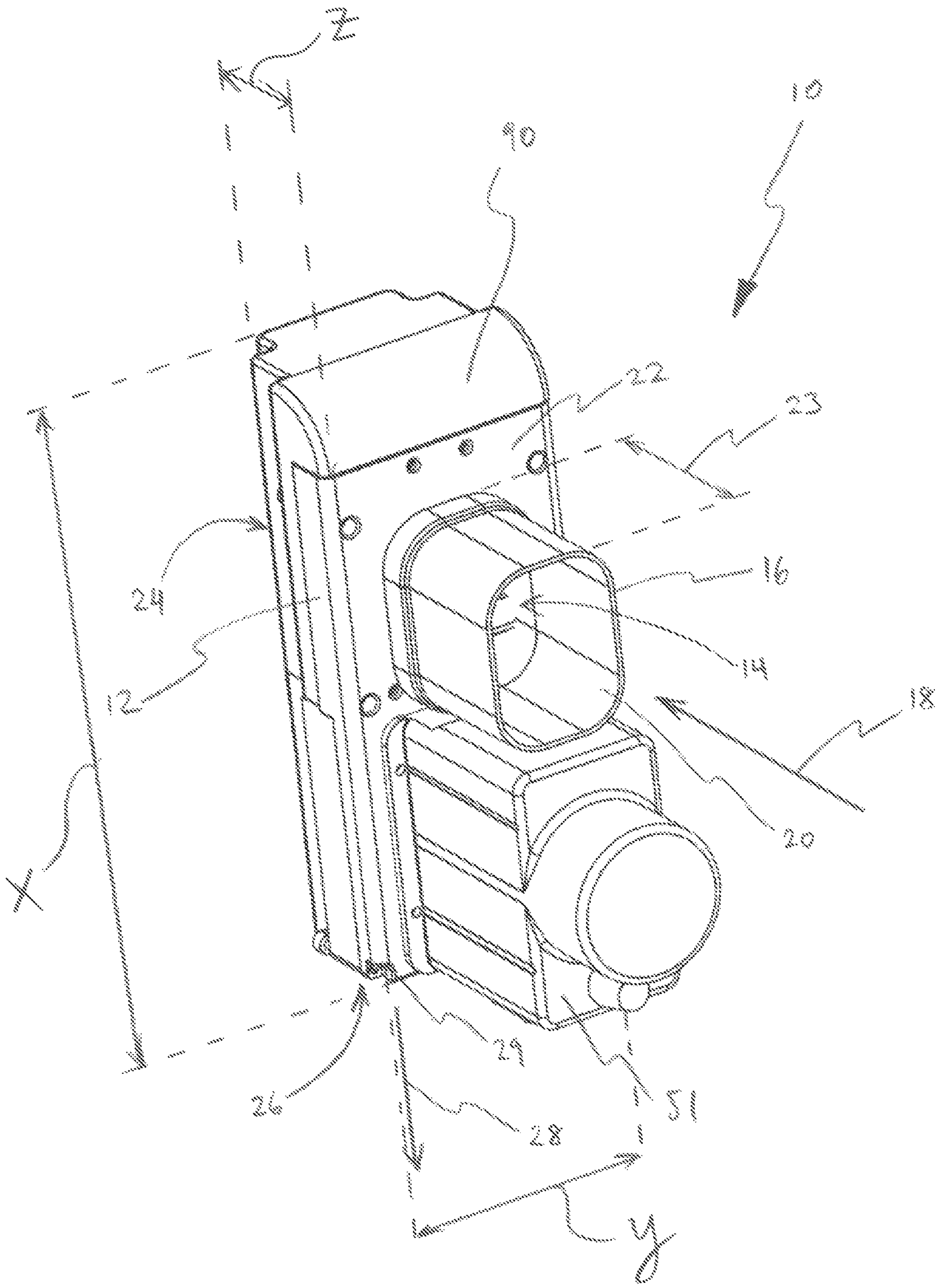
FIG. 1 is a schematic isometric view of the handheld motorised food cutting device.
Figure 2:
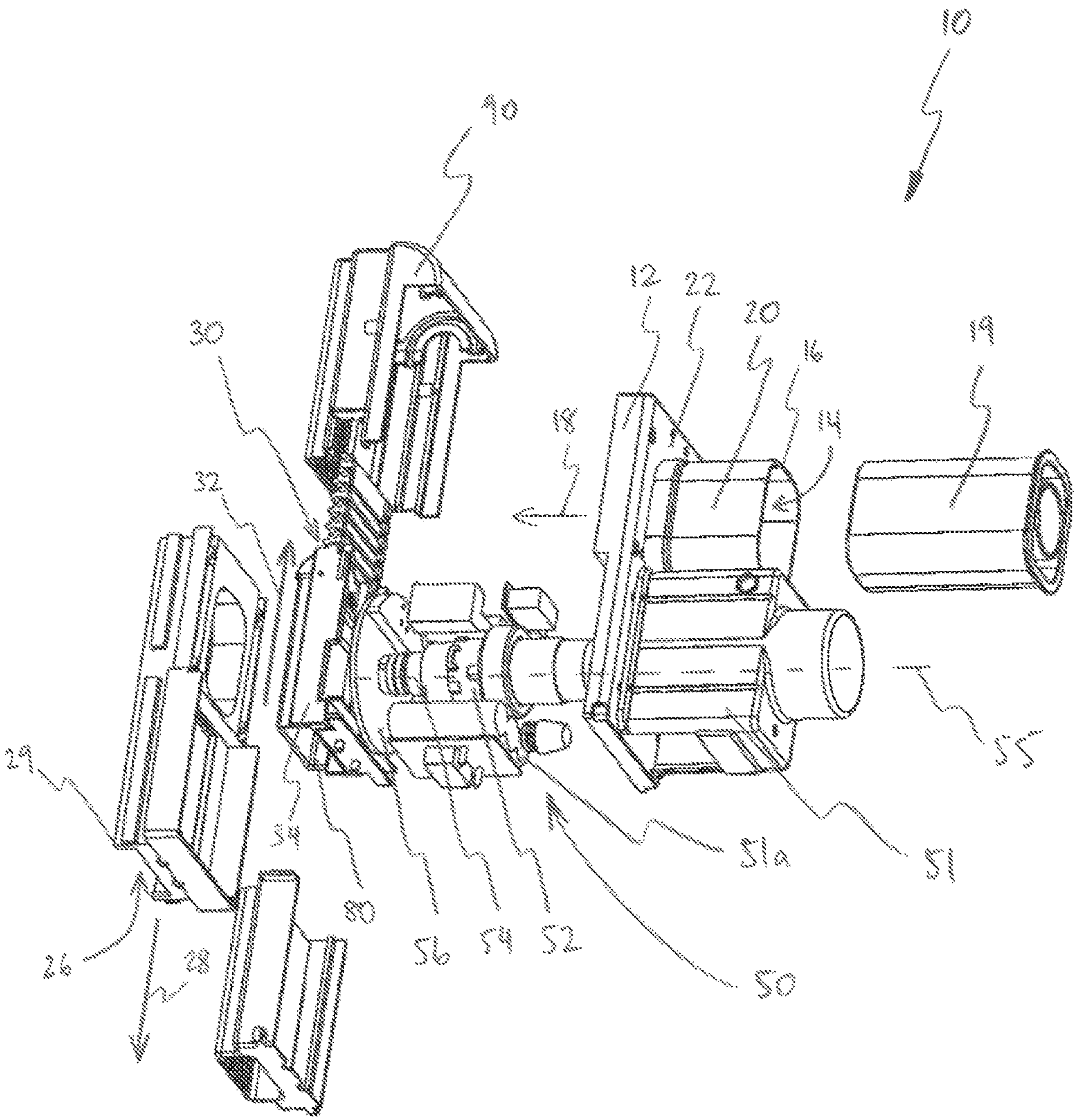
FIG. 2 is a schematic exploded isometric view of the handheld motorised food cutting device of FIG. 1.
Figure 3:
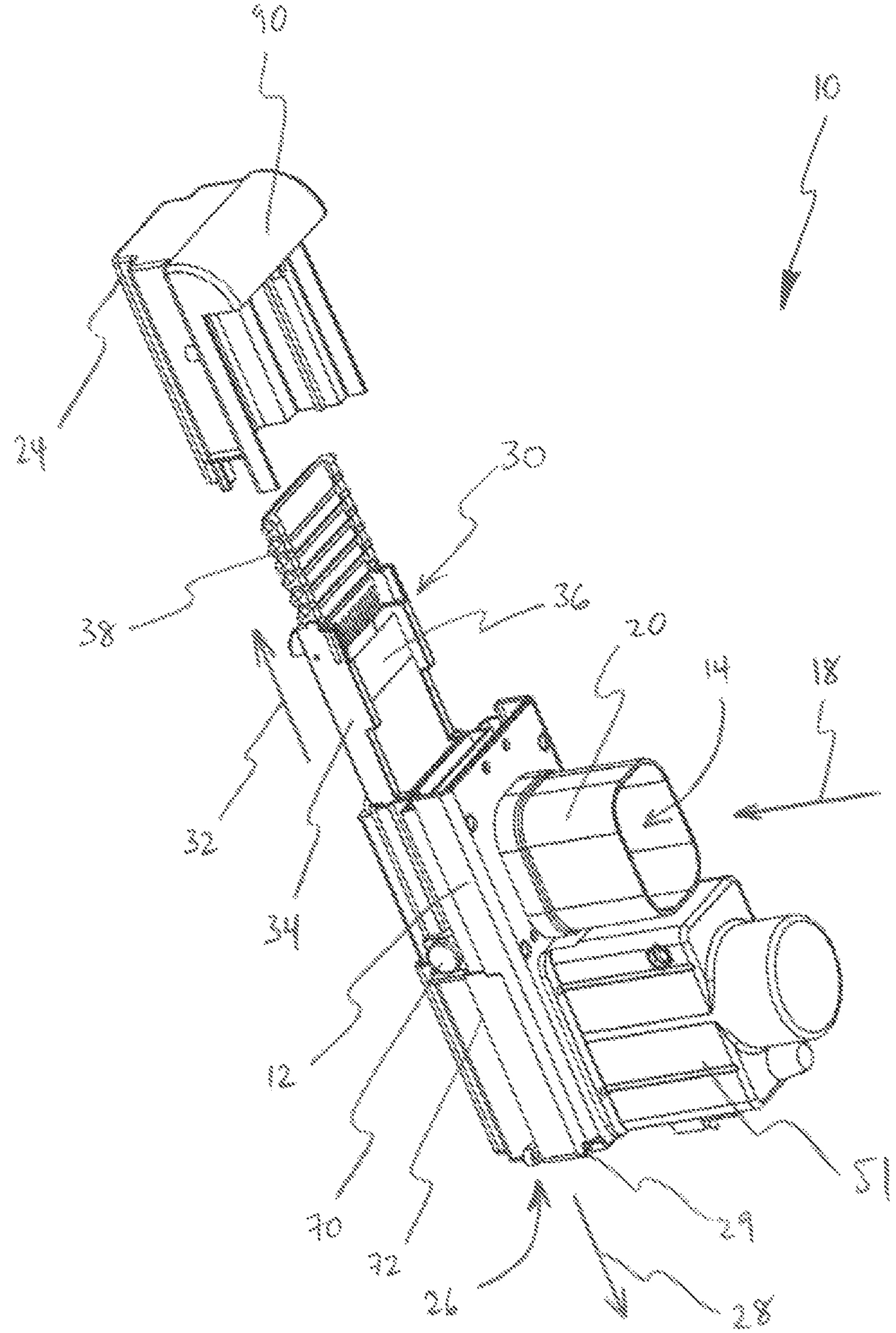
FIG. 3 is a further schematic isometric view of the handheld motorised food cutting device of FIG. 1.

In FIGS. 1 to 13 of the accompanying drawings, there is schematically depicted a handheld motorised food cutting device 10. The handheld motorised food cutting device 10 includes a body 12 having an inlet passage 14 extending inwardly of the body 12 from an inlet opening 16 through which a food item (not shown) to be processed is inserted. The inlet passage 14 is adapted to allow the food item to move along the inlet passage 14 in a processing direction 18. The movement of the food item along the inlet passage 14 may be aided by a pusher 19 (as best shown in FIG. 2). In the depicted embodiments, the inlet passage 14 is defined by a feed tube 20 having a generally rectangular cross-section with rounded corners, and the pusher 19 has a corresponding cross-sectional shape to facilitate insertion into the feed tube 20. The feed tube 20 extends away from a first surface 22 of the body 12 such that the inlet opening 16 is spaced apart by a distance 23 from a first surface 22. It will be appreciated that in other embodiments (not shown), the inlet passage 14 may alternatively define an opening in the body 12, such that the inlet opening 16 is located generally on the same plane as the first surface 22 of the body 12.

Figure 4:
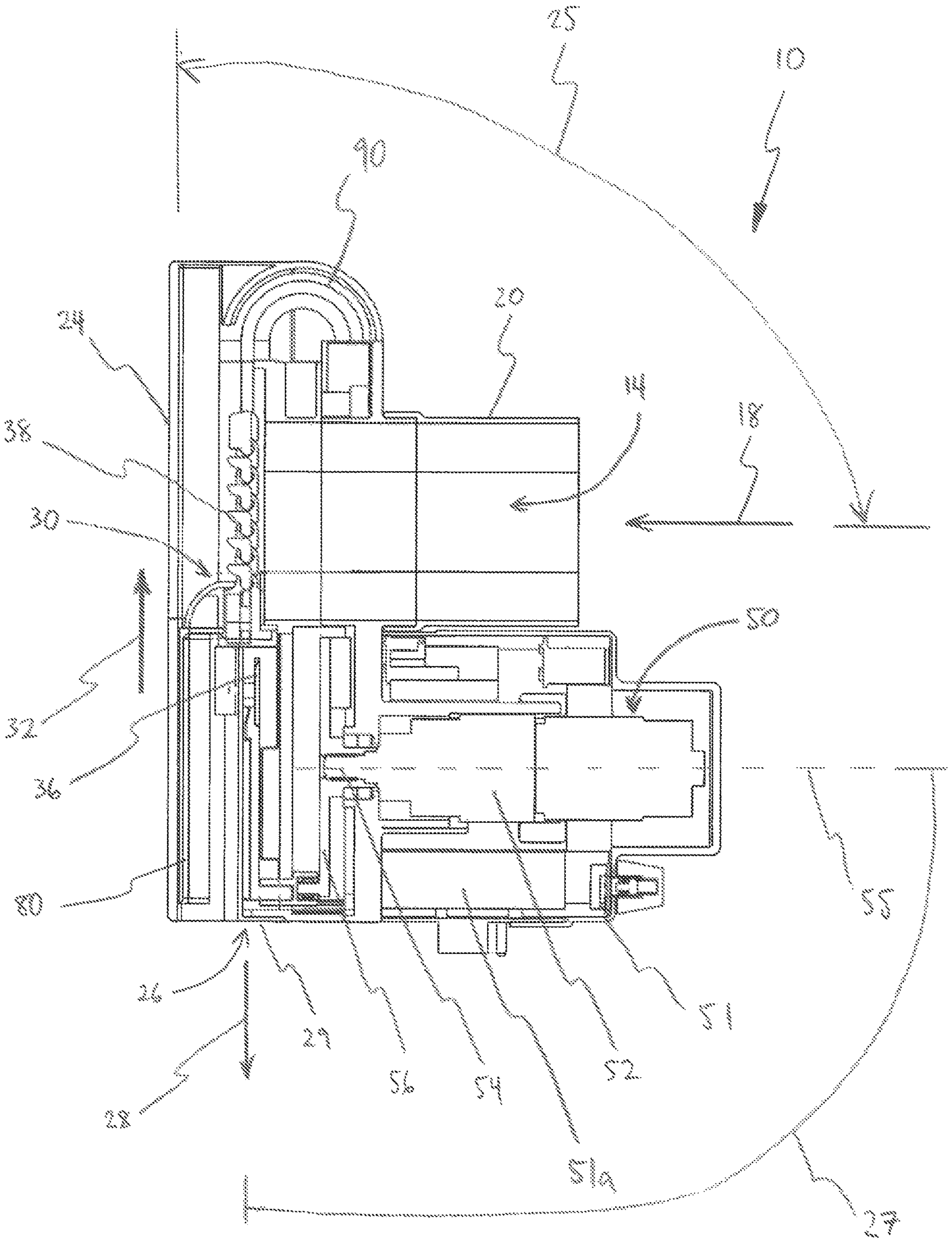
FIG. 4 is a schematic side elevation view of the handheld motorised food cutting device of FIG. 1.

The body 12 is adapted to be gripped in a user's hand so that the device 10 is supported by the hand. In the depicted embodiments, the body 12 includes a second surface 24 that opposes the first surface 22. The second surface 24 is adapted to abut a palm of the user's hand, allowing fingers of the user's hand to extend at least partly about the body 12 so that the body 12 is gripped. For example, the user's fingers may extend generally along the processing direction 18 and at least partly about the body 12 during use, such that the processing direction is generally horizontal. It will be appreciated that the device 10 may be lifted and supported by one hand, thus allowing the other hand to insert the food items into the inlet passage 14. The second surface 24 is generally transverse of the processing direction 18. Accordingly, it will be understood that when the second surface 24 abuts the user's palm, the second surface 24 is generally parallel to a direction of extension of the user's forearm, such that the user's forearm extends in a direction that is generally transverse of the processing direction 18. It is envisaged that the second surface 24 is inclined to the processing direction by an angle 25 (as best shown in FIG. 4) of between 70 degrees to 110 degrees. In embodiments, the angle 25 is between 80 degrees to 100 degrees, and preferably about 90 degrees. Referring to FIG. 1, the body 12 has a longitudinal length X extending generally transverse of said processing direction 18, a width Y generally transverse of said processing direction 18 and said longitudinal length X, and a depth Z transverse of said longitudinal length Z and width Y. The surface 24 generally has the width Y so that the body 12 fits in the user's hand so that the device 10 can be lifted and supported by the user's hand in use.

It will be appreciated that the surface that is to be gripped by the user is not limited to the second surface 24 of the body 12. For example, it is envisaged that in an alternative embodiment (not shown), the body 12 may include a base portion having the inlet passage 14 and a handle portion extending from the base portion. Preferably, the handle portion extends from the base portion in the processing direction 18. The handle portion includes a surface that is to be gripped by the user (i.e. in a similar manner to gripping the handle of a mug).

It is envisaged that the body 12 may include a handle or strap (not shown) extending over the second surface, for example, to secure the position of the user's hand with respect to the device 10 and to support the user's grip on the device 10. The handle or strap may be flexible or rigid, and adjustable in size (e.g. by way of a belt and buckle or hook and loop mechanism) to accommodate different hand sizes. It will be appreciated that the handle or strap may have an anti-microbial coating to allow for ease of cleaning and/or to provide resistance against undesirable growth of bacteria or other organisms from repeated handling.

The body 12 also includes an outlet passage 26 extending along an outlet direction 28 that is generally transverse of the processing direction 18. It is envisaged that the outlet direction 28 is at an angle 27 (as best shown in FIG. 4) of between 70 degrees to 110 degrees of the processing direction 18. In embodiments, the angle 27 is between 80 degrees to 100 degrees, and preferably about 90 degrees. The body 12 also includes an outlet opening 29 through which the cut food items exit from the device 10.

The device 10 further includes a blade assembly 30 moveably mounted in the body 12. In preferred forms, the blade assembly 30 is slidably mounted in the body 12. The blade assembly 30 is adapted for reciprocating movement along a cutting path. In the depicted embodiments, the cutting path extends along a cutting direction 32 that is generally transverse of the processing direction 18 and generally parallel to the outlet direction 28. Accordingly, it will be appreciated that the cutting direction 32 is also at an angle 27 (as best shown in FIG. 4) of between 70 degrees to 110 degrees of the processing direction 18. In embodiments, the angle 27 is between 80 degrees to 100 degrees, and preferably about 90 degrees. The blade assembly 30 is exposed to the inlet passage 14 so as to engage the food item that is moved along the processing direction 18.

Figure 5:
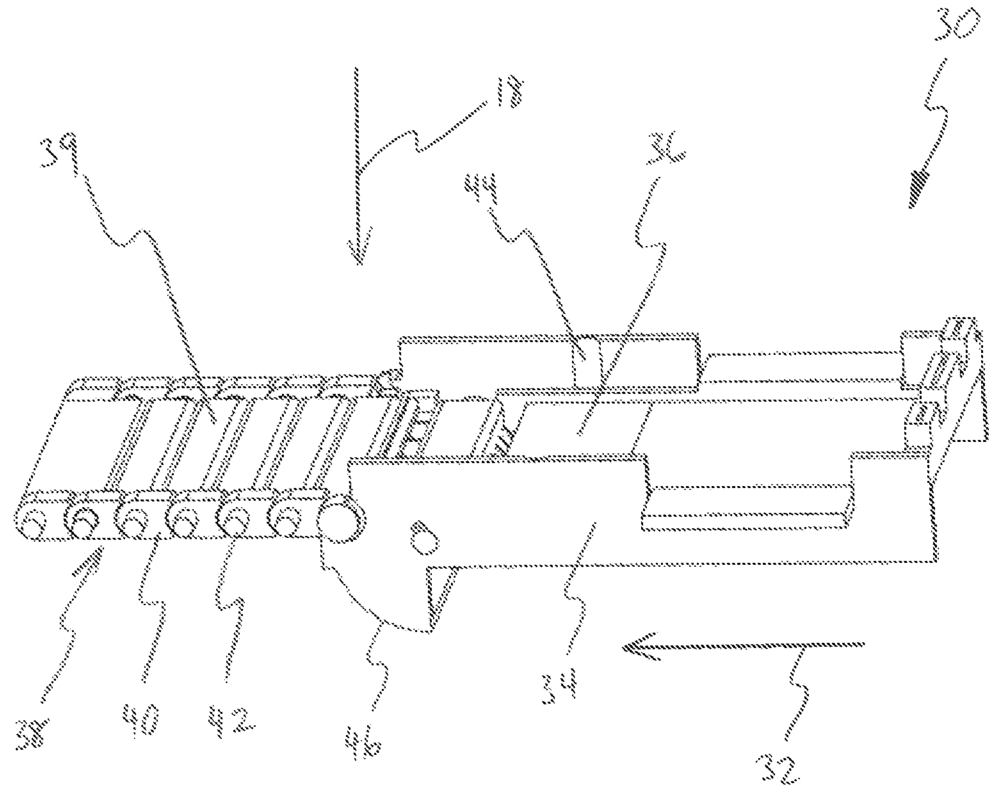
FIG. 5 is a schematic isometric view of a blade assembly of the handheld motorised food cutting device of FIG. 1.
Figure 6:
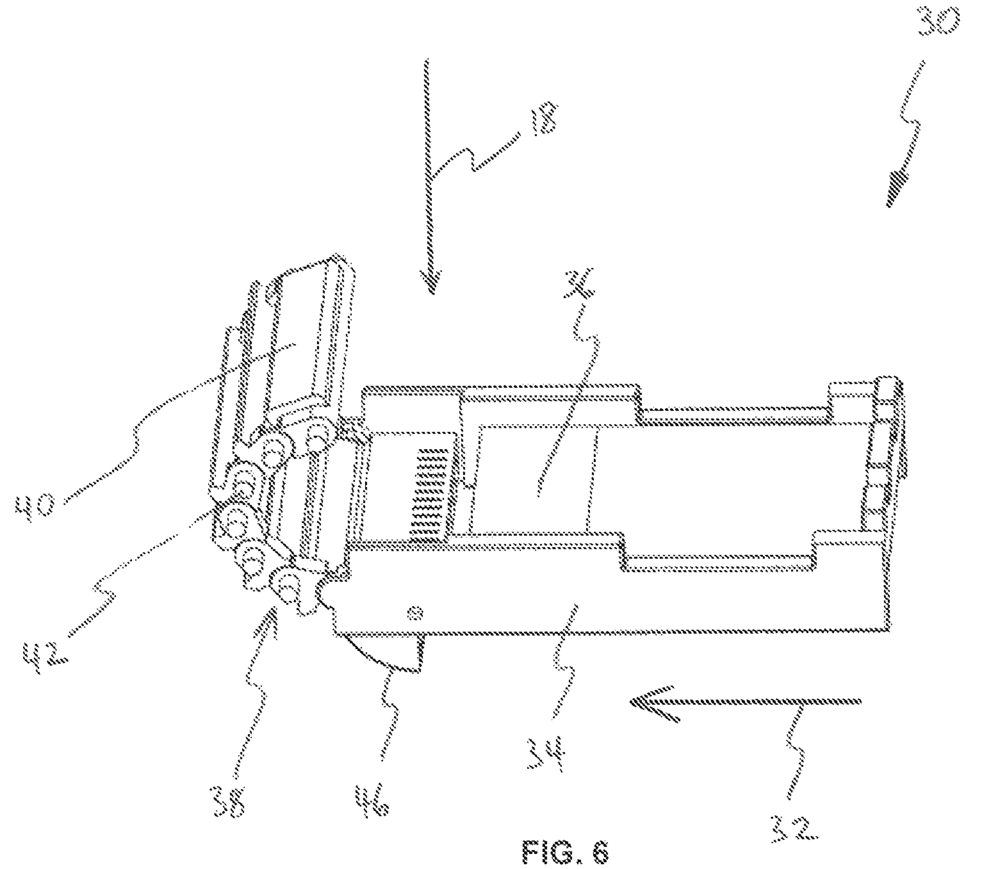
FIG. 6 is a further schematic isometric view of the blade assembly of FIG. 5.
Figure 7:
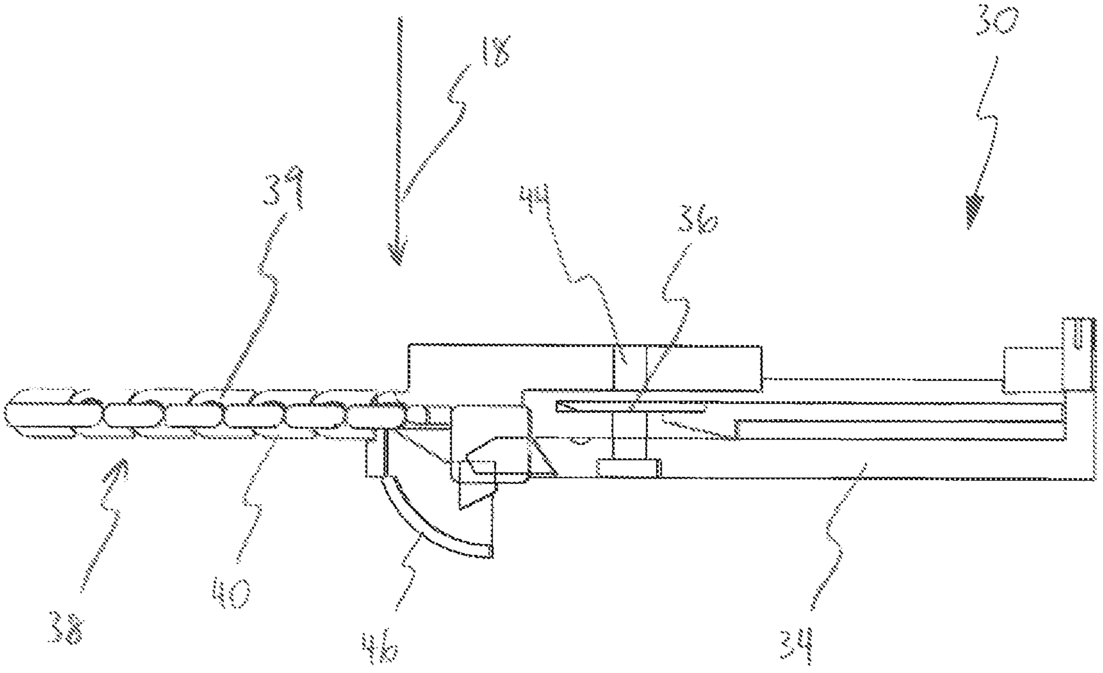
FIG. 7 is a schematic side elevation view of the blade assembly of FIG. 5.
Figure 8:
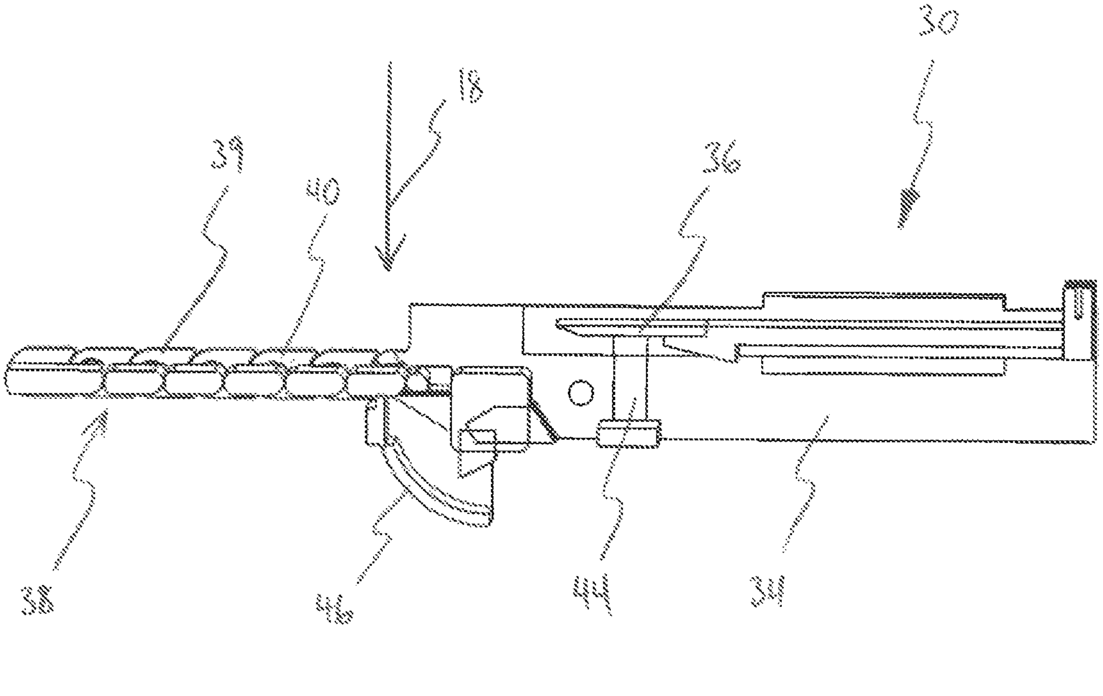
FIG. 8 is a further schematic side elevation view of the blade assembly of FIG. 5.

As best shown in FIGS. 5 and 6, the blade assembly 30 includes a blade carrier 34 adapted to hold a blade 36 to cut the food items. In preferred forms, the blade 36 is also slidably mounted to the body 12, and both the blade 36 and the body 12 are slidably moveable along the processing direction 18. It will be appreciated that the blade 36 and the body 12 may be configured to move simultaneously to reduce the likelihood of cut food items being jammed in the device 10 when the blade assembly 30 is moved back and forth along the cutting path.

In the depicted embodiments, the blade 36 is generally flat and extends along a direction generally parallel to the cutting direction 32. Accordingly, in this form, the blade 36 would produce cuts with a uniform thickness. It will be appreciated that direction of extension of the blade 36 may be adjusted so as to vary the thickness or the angle of the cut to the food item. In the depicted embodiments, the blade 36 has a single leading (i.e. cutting) edge that points in the cutting direction 32 so as to engage and cut the food item that is inserted through the inlet passage 14. It will be appreciated that in some embodiments, the blade 36 may have two cutting edges pointing in the cutting direction 32 and away from the cutting direction 32, such that the reciprocating movement of the blade assembly 30 along the cutting path may allow the blade 36 the cut the food item in opposing directions. In other embodiments (not shown), the blade 36 may have a serrated, corrugated or curved form, or alternatively be in the form of a julienne blade or grater blade so as to produce different types of cuts or slices to the food item. The blade assembly 30 may also be provided with an auxiliary blade set that works in addition to the blade 36 to produce different types of cuts or slices to the food item, as will be described in further detail below. It will be understood that cut food items pass from the blade 36 along the outlet passage 36 to the outlet opening 29 in the outlet direction 28.

The blade assembly 30 further includes a blade cartridge 38 having a support surface 39 for engaging and supporting the food item that is inserted into the inlet passage 14. The blade cartridge 38 includes a plurality of interconnected members 40. In a preferred form, each member 40 is connected to an adjacent member by way of an articulated link 42 so as to enable flexibility and curvilinear movement of the blade cartridge 38 (e.g. as best shown in FIG. 6). The resulting curvature of the blade cartridge 38 may at least minimise the amount of space required in the device 10 to accommodate movement of the blade carrier 34 in the cutting direction 32. It will be appreciated that the blade cartridge 38 as a whole and/or each individual member 40 of the blade cartridge 38 may be overmoulded with a suitable food-grade material such as silicone or a thermo-plastic elastomer to allow for ease of cleaning. The blade cartridge 38 as a whole and/or each individual member 40 of the blade cartridge 38 may additionally or alternatively have an anti-microbial coating to allow for ease of cleaning and/or to provide resistance against undesirable growth of bacteria or other micro-organisms.

As mentioned above, and as best shown in FIGS. 7 and 8, the blade 36 (which is slidably mounted to the body 12) may be slidably moveable within the blade carrier 34 along the processing direction 18. Accordingly, both the blade 36 and the body 12 may be moveable with respect to the blade cartridge 38, and in particular with respect to the support surface 39 of the blade cartridge. This may at least allow the distance between the blade 36 and the food support surface 39 to be varied and adjusted according to a desired thickness of the cut food item. It is envisaged that the adjustment of the relative movement between the blade 36 and the food support surface 39 may be driven by an associated rotary switch or knob (not shown) positioned on the body 12. In the depicted embodiments, the blade carrier 34 includes a pair of channels 44 to guide the sliding movement of the blade 36 along the processing direction 18. It will be appreciated that the blade carrier 34 may include a guard 46 to prevent access to the blade 36 and/or the blade cartridge 38 by a user's finger.

As best shown in FIGS. 2 and 4, the device 10 further includes a drive assembly 50 to drive the blade assembly 30 along the cutting direction 32. In the depicted embodiments, the drive assembly 50 is disposed within a housing 51 that extends from the body 12. The drive assembly 50 is operable by way of a portable power source, such as rechargeable batteries 51*a*, also located in the housing 51. This allows the device 10 to be a handheld device that is truly portable by eliminating the need to have a cumbersome power cable extending from the device 10, particularly during use of the device 10. It is envisaged that the batteries 51*a* may be rechargeable by way of induction charging means, whereby the device 10 may be docked to a corresponding induction charging dock (not shown) for ease of charging.

The drive assembly 50 includes a motor 52 having an output shaft 54. The output shaft 54 has a rotation axis 55 that is generally parallel to the processing direction 18. The output shaft 54 is connected to a yoke plate 56, which is connected to and operatively associated with the blade assembly 30. The output shaft 54 is rotatably driven at a motor speed about the rotation axis 55 by the motor 52 to drive a corresponding rotation of the yoke plate 56 about the rotation axis 55 in a clockwise or counter-clockwise direction. As will be understood by a person skilled in the art, by way of a scotch yoke mechanism, rotation of the yoke plate 56 about the rotation axis 55 in turn drives the movement of the blade assembly 30 along the cutting direction 32.

Figure 9:
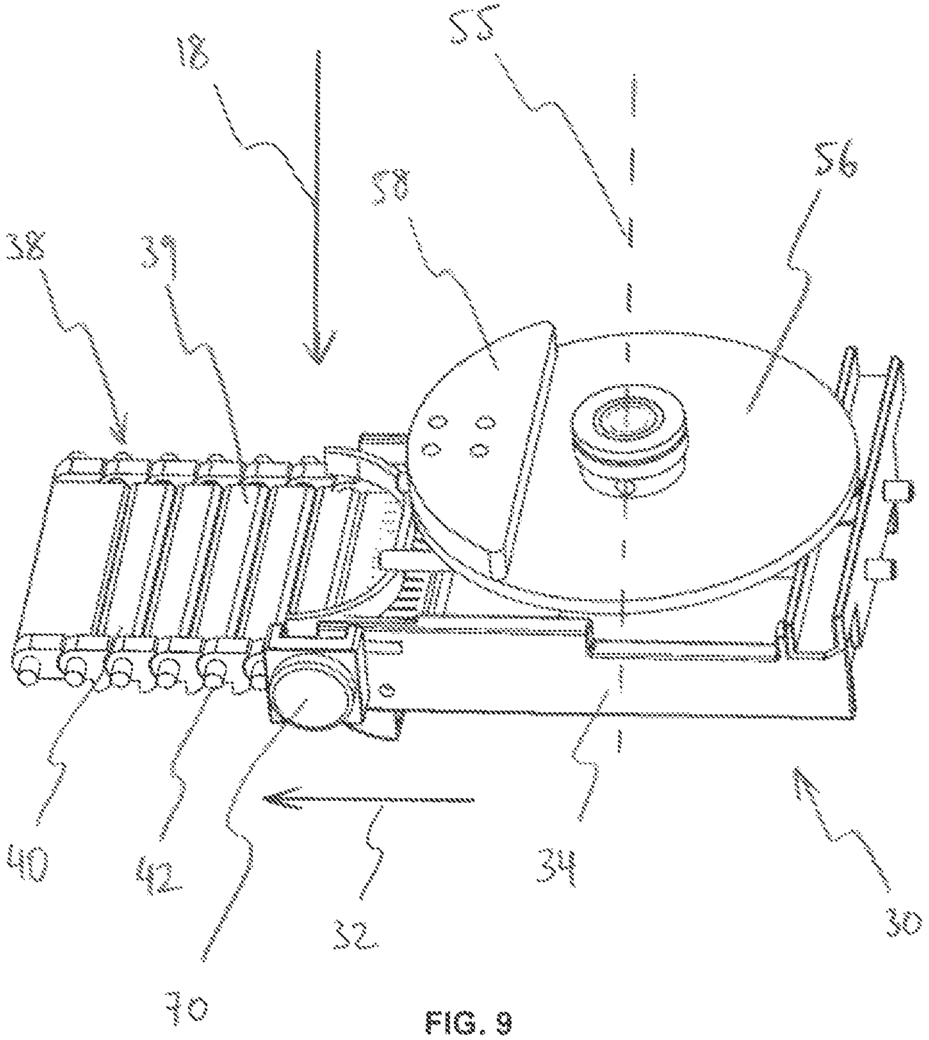
FIG. 9 is a further schematic isometric view of the blade assembly of FIG. 5.

Referring to FIG. 9, the yoke plate 56 may include a protrusion 58 to act as a counter balance and reduce vibration (e.g. from the movement of the blade cartridge 38) in the yoke plate 56 as it rotates about the shaft axis 55. It is envisaged that the yoke plate 56 may include one or more stop members (not shown), e.g. in the form of rubber stoppers, so as to prevent the yoke plate 56 from travelling further than a predetermined distance, and to also prevent the yoke plate 56 from bumping against adjacent components of the device 10. It will be appreciated the that any of the adjacent components of the device 10 may additionally or alternatively include one or more stop members to provide a similar functionality. It will be appreciated that the motor 52 may be driven through a gearbox to achieve the desired motor speed and torque required for cutting the food items. The motor 52 may also have a variable speed such the user may adjust the desired speed for cutting the food items to suit their requirements and/or the type of food being cut. It is envisaged that the gearbox may have adjustable gear stages so that the torque and speed may be varied, e.g. a higher torque/lower speed for particularly dense foods or thick cuts.

Figure 10:
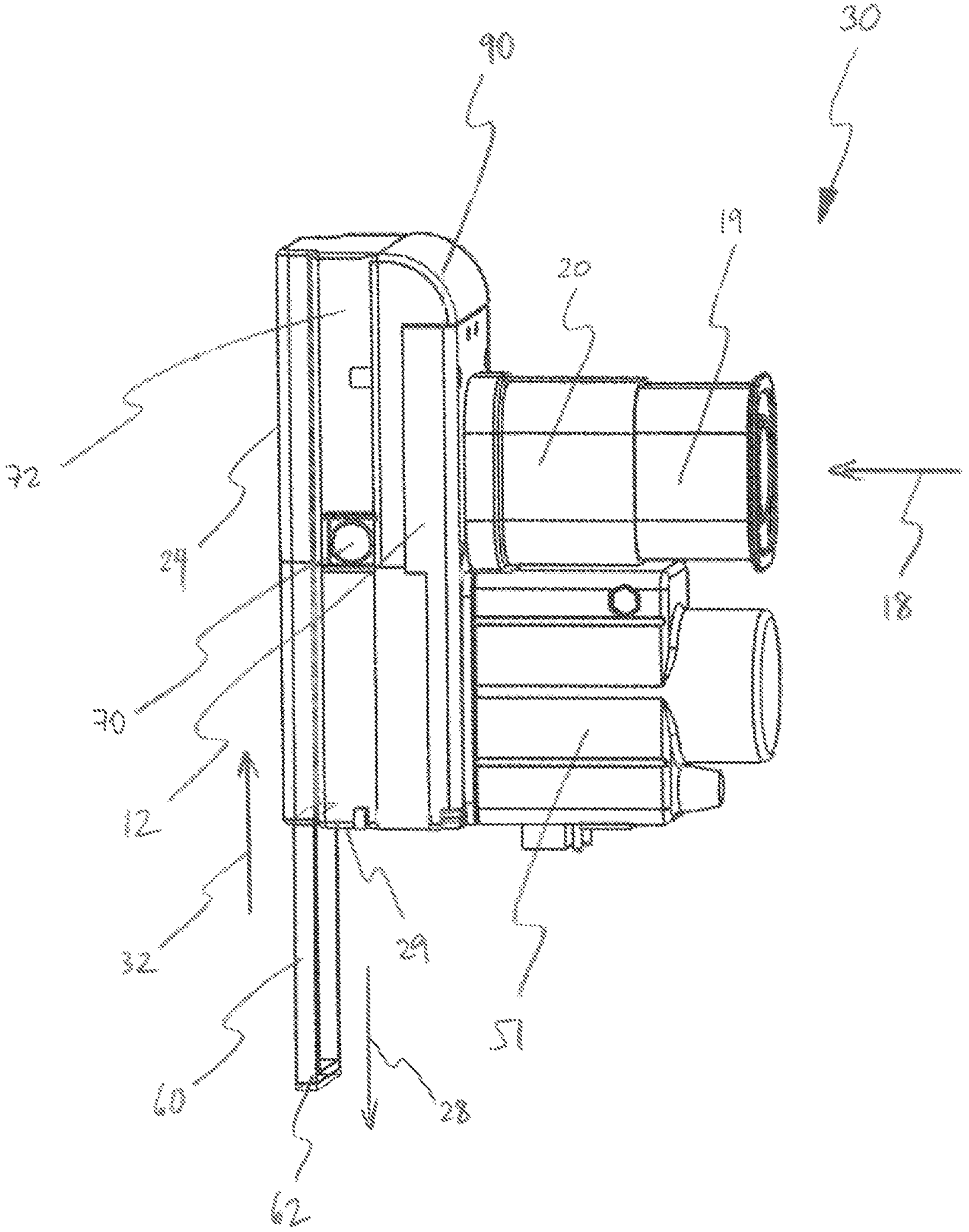
FIG. 10 is a further schematic isometric view of the handheld motorised food cutting device of FIG. 1.

As best shown in FIG. 10, the device 10 may include a stand 60 that is slidably mounted to the body 12. The stand 60 includes an end portion 62 to be rested against a surface (e.g. kitchen benchtop) above which the device 10 is being operated. It will be appreciated that the end portion 62 may be formed from a non-slip and/or shock absorbent material to prevent the device 10 from slipping off the surface. The stand 60 may at least provide support for the device 10 on the surface so that the user does not have to hold the device 10 in the air, which may aid in reducing the likelihood of fatigue in the user's hand or arm from prolonged use of the device 10.

The device 10 includes at least one switch 70 (see FIG. 3, for example) which is actuatable to enable and disable operation of the drive assembly 50. In the depicted embodiments, the at least one switch 70 is in the form of a button located on a side surface 72 of the body 12. The at least one switch 70 may alternatively or additionally be provided on an opposing side surface of the body 12 to accommodate a left and/or right-handed user. It will be appreciated that the at least one switch 70 is positioned at a predetermined distance from the second surface 24 of the body 12, i.e. the surface that abuts the palm of the user. This predetermined distance would preferably accommodate an average span of an adult's hand, e.g. an average distance from an adult's thumb to a central portion of the adult's palm. It is envisaged that an average span on an adult's hand from the tip of the thumb to the tip of the little (i.e. fifth) finger when the hand is outstretched may range from between 15 to 25 cm. An average span on an adult's hand from the tip of the thumb to the central portion of the palm may range from between 9 to 15 cm. The positioning of the at least one switch 70 at this predetermined distance may at least provide a safety feature to prevent a child from operating the device 10. Additionally, the device 10 may include one or more safety switches (not shown) operatively associated with a processor (not shown) and the drive assembly 50. The safety switches may be configured to detect the presence of the user's hand at one or more predetermined locations on the body 12. It is envisaged that the predetermined locations on the body 12 would be no less than the average adult hand span (e.g. the distance between the tip of the thumb to the tip of the little finger. As such, the safety switches are configured to detect when an adult user has a full grip on the body 12. The drive assembly 50 would thus only be permitted to operate if the safety switches detect the user's hand at the one or more predetermined locations and sends a corresponding signal to the processor. The safety switch may be in the form of a mechanical switch, a mechanical sensor, an optical sensor, or proximity sensor, for example.

Figure 11:
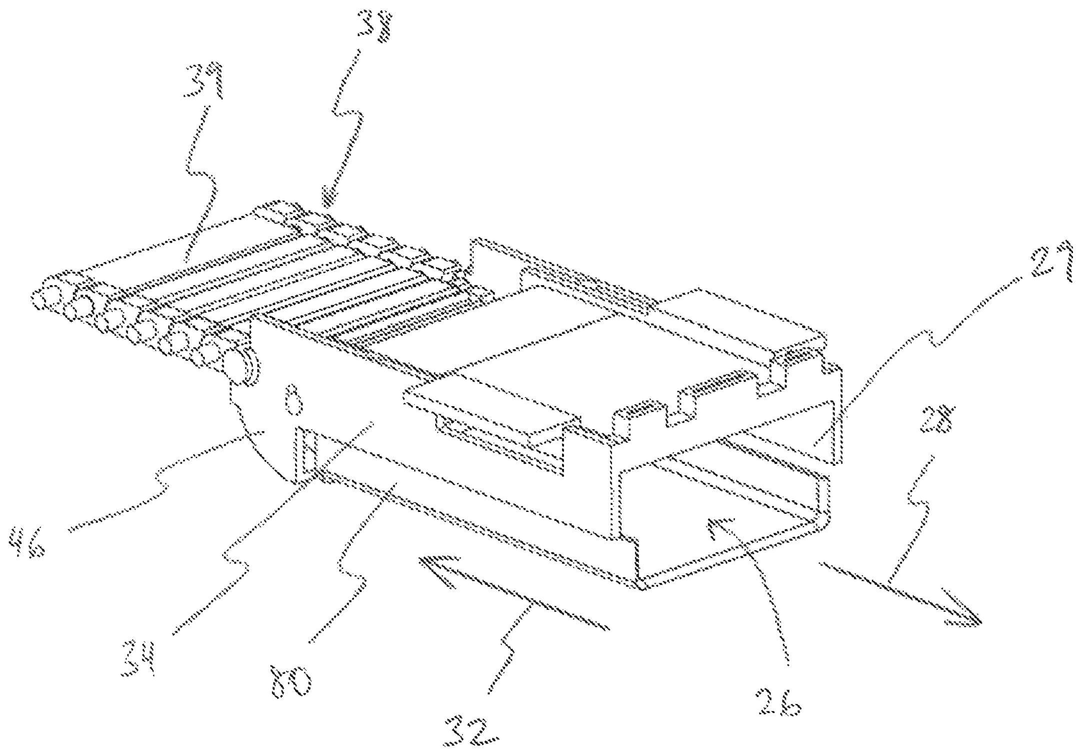
FIG. 11 is a further schematic isometric view of the blade assembly of FIG. 5.
Figure 12:
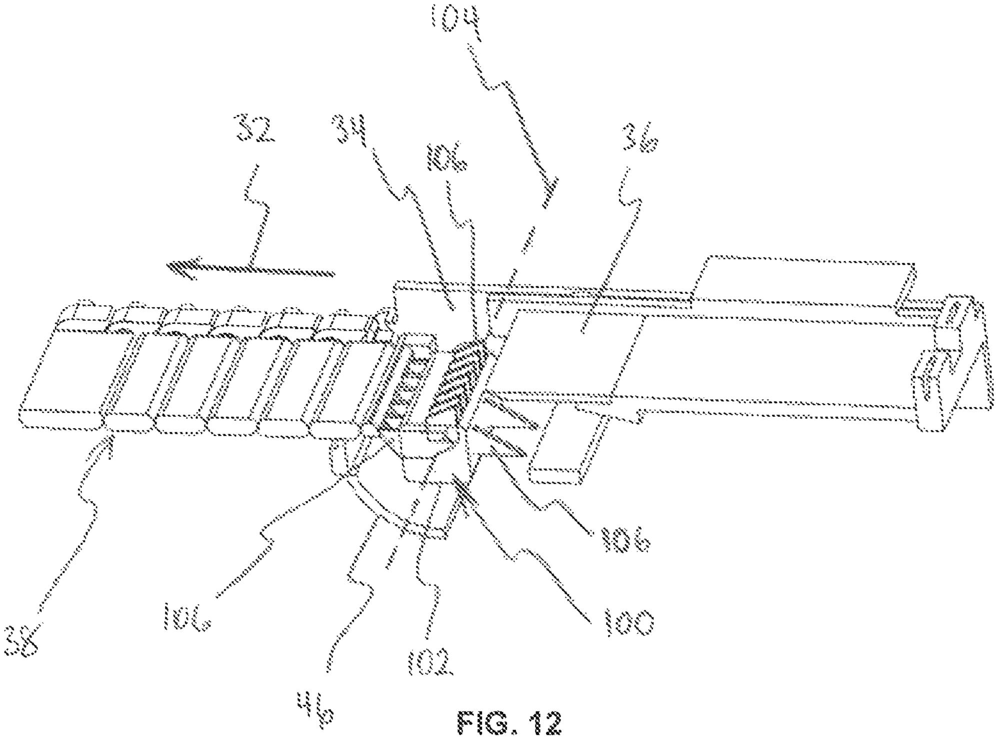
FIG. 12 is a further schematic isometric view of the blade assembly of FIG. 5.
Figure 13:
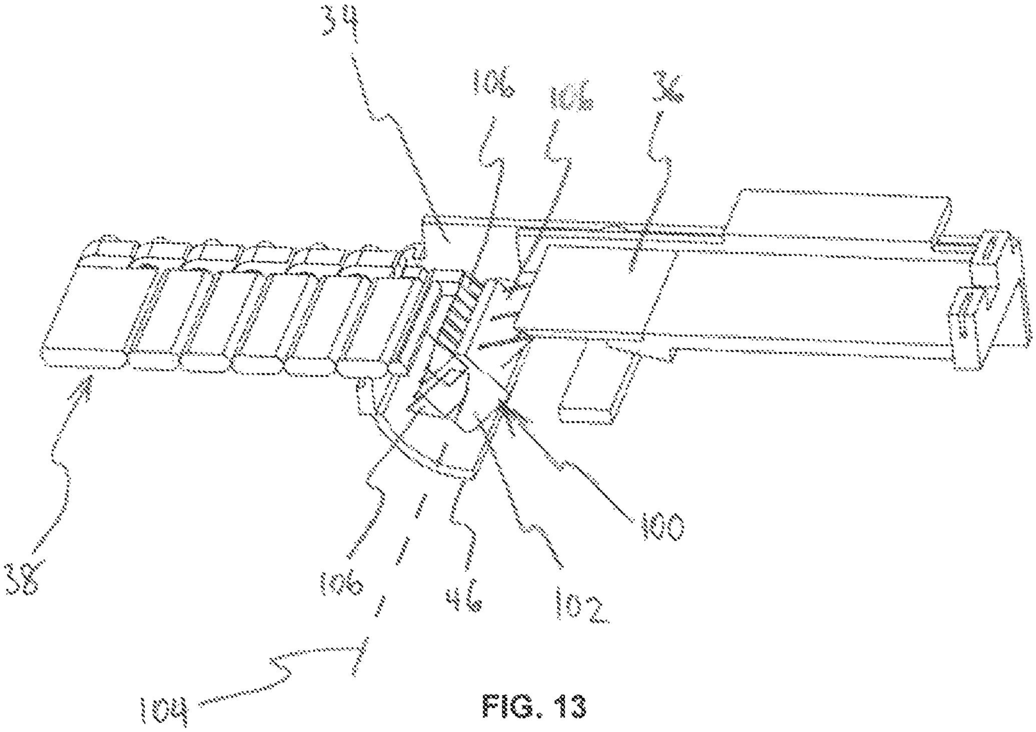
FIG. 13 is a further schematic isometric view of the blade assembly of FIG. 5.

Referring to FIGS. 2, 4 and 11, the device 10 may further include an ejector member 80 that is mounted to the blade carrier 34. The ejector member 80 is parallel to the surface 39 of the blade cartridge 38. The ejector member 80 aids in ejecting or removing cut food items from the surface 39 by abutting and thereby pushing the cut food items towards the outlet passage 62 along the outlet direction 28 when the blade assembly 30 is driven in the cutting direction 32.

Returning to FIGS. 1 to 4, the device 10 also includes a cover member 90 which is mounted to the body 12. It will be appreciated that the cover member 90 may either be separately or integrally formed with the body 12. In the depicted embodiments, the second surface 24 (i.e. the surface that abuts the user's palm) is provided on the cover member 90. The cover member 90 may be detachable to facilitate the insertion or removal of the blade cartridge 38. It will be appreciated that the cover member 90 may have a curved interior to facilitate the curvature of the blade cartridge 38. The combination of the curved interior of the cover member 90 and the curvability (i.e. flexible nature) of the blade cartridge 38 may at least minimise the amount of space required in the device 10 to accommodate movement of the blade carrier 34 in the cutting direction 32. It will be appreciated that the curved arrangement of the cover member 90 and the blade cartridge 38 may at least reduce the overall length of the device 10 by between 50 to 60 mm. It is envisaged that the device 10 may further include a cleaning brush disposed within the cover member 90 (or anywhere within the interior of the body 12) to facilitate ease of cleaning of the blade cartridge 38.

As noted above, and with particular reference to FIGS. 12 and 13, the blade assembly 30 may further include an auxiliary blade set 100 rotatably mounted to the blade carrier 34. In the depicted embodiment, the auxiliary blade set 100 includes a central portion 102 having a longitudinal axis 104, which is generally transverse to the cutting direction 32. The central portion 102 includes at least one auxiliary blade portion 106 which may be a julienne blade or any other form of serrated blade having cutting edges that are extend in a direction transverse to the cutting direction 32. Accordingly, the auxiliary blade portion 106 may be used to create different types of cuts or slices to the food item e.g. julienne slices, other forms of thin or thick cuts. The auxiliary blade portion 106 may also be in the form of any other suitable type of blade, such as a grater blade. The central portion 102 is rotatable about the longitudinal axis 104 to allow user selection of the desired auxiliary blade portion 106 that is to be exposed to the inlet passage 14. It will be appreciated that the user selection of the desired blade portion 106 may be facilitated by actuating an associated auxiliary rotary knob or dial (not shown) located on the body 12 of the device 10.

In embodiments, the device 10 may include a tilt orientation sensor (not shown) operatively associated with the processor and the drive assembly 50. The tilt orientation sensor may be configured detect an upright, or use position, of the device 10. This upright or use position is defined by the cutting direction 32 and the outlet direction 28 being generally vertical, and the processing direction 18 being generally horizontal. As a user's forearm would typically be extended in a horizontal direction to hold the device 10 (i.e. in a similar manner to holding a drink bottle), this upright or use position may at least facilitate a stable and natural grip for the user on the device 10.

It will further be appreciated that the various components of the device 10 as a whole may be hermetically sealed to prevent water ingress to the interior of the device 10. Accordingly, the device 10 may be rinsed under a tap to allow for ease of cleaning after use.

The operation of the device 10 will now be described.

The user grips the device 10 at the second surface 24 (i.e. the surface of the body 12) such that the second surface 24 abuts the user's palm. This position allows the user's fingers to extend at least partly about the body 12 so that the body 12 is gripped. The device 10 is then oriented by the user so that it is in a generally upright position (i.e. whereby cutting direction 32 and the outlet direction 28 are generally vertical, and the processing direction 18 is generally horizontal). In this upright (i.e. in use) position, the user's forearm extends generally parallel to the second surface 24, and the user's palm is generally transverse to the processing direction 18. Preferably, the user's palm would be positioned such that the processing direction 18 is substantially aligned with the centerpoint of the user's palm. In this way, any force acting in the processing direction 18 would be normal to the centerpoint of the user's palm to maximise the stability of the user's grip on the device 10 during operation. It will be appreciated that the load distribution is substantially vertical during operation of the device 10, such that the majority of the load is carried by the user's arm and places less strain on the user's wrist. This may at least aid in reducing the likelihood of user fatigue from prolonged use of the device 10.

The device 10 is then powered on by the user by activating the at least one switch 70. In preferred forms, the safety switches and the tilt orientation sensor detect the presence of the user's hand at predetermined locations and the upright (in use) orientation of the device 10, respectively. Operation of the drive assembly 50 is then enabled to drive the blade assembly 30 for reciprocating movement along the cutting direction 32. The user may adjust the cut thickness of the food item by rotating the associated rotary switch or knob to vary the distance between the blade 36 and the support surface 39 of the blade cartridge 38. The user may also rotate the associated auxiliary knob or dial to select the desired auxiliary blade portion 106 that is to be exposed to the passage 16 (i.e. to select the cut type). Once the user has made the above adjustments, they can then insert a food item into the inlet passage 14 via the inlet opening 16 of the body 12. The food item travels along the inlet passage 14 along the processing direction 18 until the food item engages the blade cartridge 38 of the blade assembly 30, which is being driven back and forth along the cutting path. The food item is then cut by the blade 36 and/or the auxiliary blade portion 106 to produce cut food items of the desired thickness and type. The cut food items then travel via the outlet passage 26 in the outlet direction 28 and exits the device 10 at the outlet opening 29.

Figure 14:
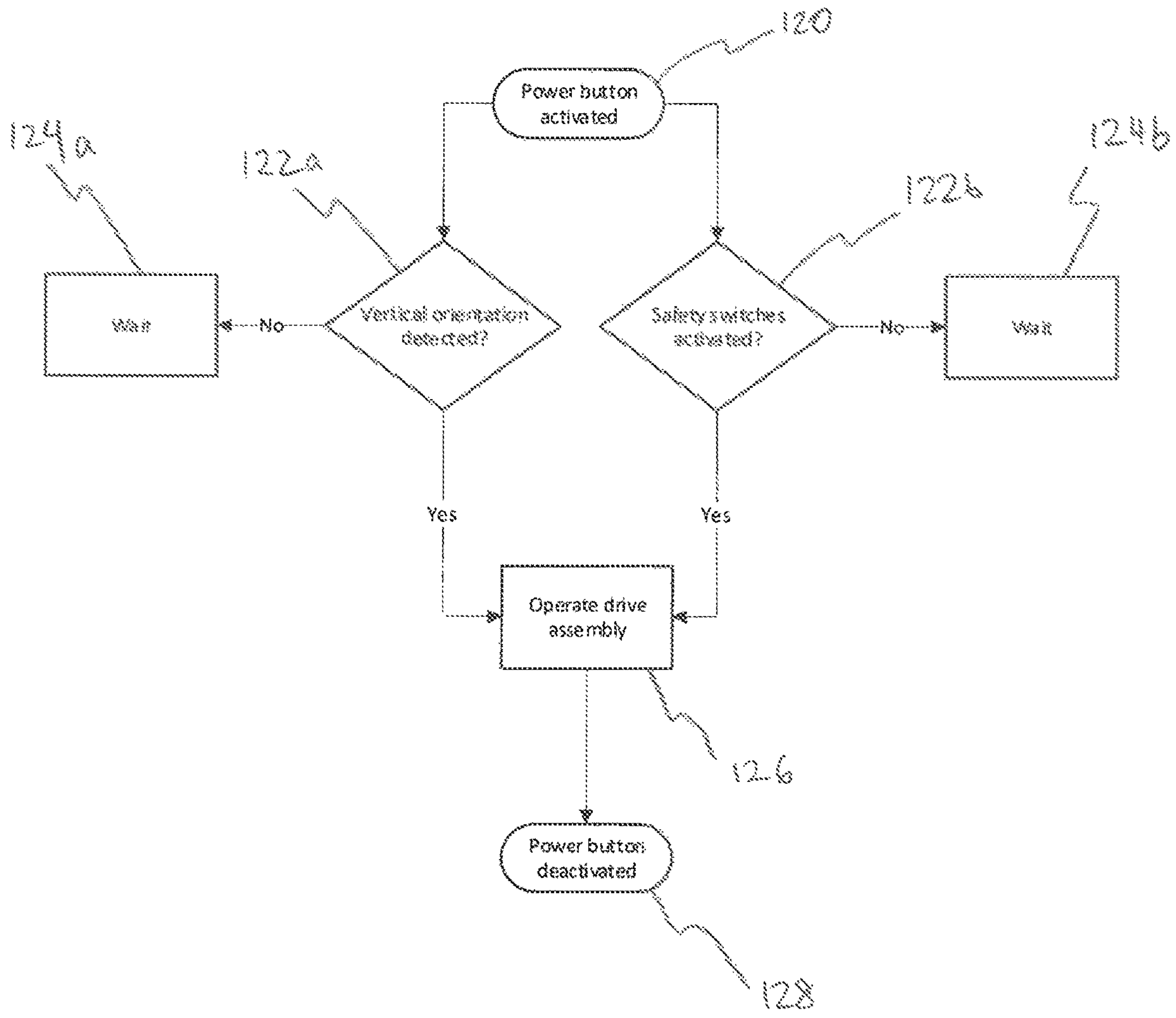
FIG. 14 is schematic view of an operation logic of the device of FIG. 1.

In FIG. 14, there is schematically depicted an example of an operation logic of the device 10 as described above. At step 120, a power button (i.e. the at least one switch 70) is activated to apply power to the device 10. At step 122*a*, the tilt orientation sensor detects the orientation of the device 10. If the device 10 is not in the upright or in use position, the tilt orientation sensor sends a signal to the associated processor to hold the operation of the drive assembly 50 at step 124*a*. If the device 10 is in the upright or in use position, the tilt orientation sensor sends a signal to the associated processor to enable operation of the drive assembly 50 at step 126. Additionally or alternatively, the device 10 may include safety switches which detect the presence of the user's hand at predetermined locations on the body 12 at step 122*b*. If the safety switches do not detect the presence of the user's hand at the predetermined locations, the safety switches send a signal to the associated processor to hold the operation of the drive assembly 50 at step 124*b*. If the safety switches detect the presence of the user's hand at the predetermined locations, the safety switches send a signal to the associated processor to enable operation of the drive assembly 50 at step 126. The operation of the drive assembly 50 is then disabled when the user deactivates the power button at step 128.

Although the invention has been described with reference to preferred embodiments, it will be appreciated by those persons skilled in the art that the invention may be embodied in many other forms.

The invention claimed is:

1. A handheld motorized food cutting device comprising:

a body to be gripped in a user's hand so that the device is supported by the hand, the body having a passage extending inwardly of the body from an inlet opening through which a food item to be processed is inserted for movement along the passage in a processing direction;

a blade assembly moveably mounted in the body for reciprocating movement along a cutting path that is transverse of said processing direction, with the blade assembly being exposed to the passage so as to be engaged by the food item moved in said processing direction; and a drive assembly to drive said blade assembly along said cutting path, wherein the body provides a surface to abut a palm of said hand, with fingers of the hand extending at least partly about said body so that the body is gripped, and wherein said processing direction is transverse of said surface, wherein the blade assembly includes a blade carrier adapted to hold a blade and a blade cartridge having a support surface for the food item, and wherein the blade cartridge includes a plurality of articulated links to enable curvilinear movement of the blade cartridge.

2. The handheld motorised food cutting device of claim 1, wherein the processing direction is inclined to said surface by an angle of between 70 degrees to 110 degrees.

3. The handheld motorised food cutting device of claim 2, wherein the angle is between 80 degrees to 100 degrees.

4. The handheld motorised food cutting device of claim 3, wherein the angle is about 90 degrees.

5. The handheld motorized food cutting device of claim 1, wherein the body has an outlet passage extending from the blade, whereby cut food passes from the blade along the outlet passage to an outlet opening in an outlet direction.

6. The handheld motorised food cutting device of claim 5, wherein said outlet direction is transverse of the processing direction.

7. The handheld motorised food cutting device of claim 6, wherein the outlet direction is at an angle of between 70 degrees to 110 degrees of said processing direction.

8. The handheld motorised food cutting device of claim 7, wherein the outlet direction is at an angle of between 80 degrees to 100 degrees of said processing direction.

9. The handheld motorised food cutting device of claim 8, wherein the outlet direction is at an angle of about 90 degrees of said processing direction.

10. The handheld motorized food cutting device of claim 1, wherein the blade is moveably mounted in the blade carrier.

11. The handheld motorized food cutting device of claim 10, wherein the blade is moveable with respect to the blade cartridge along the processing direction.

12. The handheld motorized food cutting device of claim 1, further including an ejector mounted to the blade carrier to aid in ejecting or removing cut food items.

13. The handheld motorised food cutting device of claim 1, wherein the drive assembly includes a motor having an output shaft connected to a yoke plate, the output shaft being rotatably driven to drive rotation of the yoke plate, and rotation of the yoke plate drives the movement of the blade assembly along the cutting path.

14. The handheld motorised food cutting device of claim 1, wherein the device further includes at least one switch to enable operation of the drive assembly, the switch being positioned at a predetermined distance from the surface of the body that abuts the palm.

15. The handheld motorised food cutting device of claim 1, wherein the device further includes a tilt orientation sensor operatively associated with the drive assembly.

16. The handheld motorised food cutting device of claim 1, wherein the device further includes a support stand mounted to the body.

17. A handheld motorized food cutting device comprising:

a body to be gripped in a user's hand so that the device is supported by the hand, the body having a passage extending inwardly of the body from an inlet opening through which a food item to be processed is inserted for movement along the passage in a processing direction;

a blade assembly moveably mounted in the body for reciprocating movement along a cutting path that is transverse of said processing direction, with the blade assembly being exposed to the passage so as to be engaged by the food item moved in said processing direction; and a drive assembly to drive said blade assembly along said cutting path, wherein the body has an outlet passage extending from a blade to an outlet opening in an outlet direction, wherein the outlet direction is transverse of the processing direction, wherein the blade assembly includes a blade carrier adapted to hold the blade and a blade cartridge having a support surface for the food item, and wherein the blade cartridge includes a plurality of articulated links to enable curvilinear movement of the blade cartridge.

18. A handheld motorized food cutting device comprising:

a body to be gripped in a user's hand so that the device is supported by the hand, the body having a passage extending inwardly of the body from an inlet opening through which a food item to be processed is inserted for movement along the passage in a processing direction;

a blade assembly moveably mounted in the body for reciprocating movement along a cutting path that is transverse of said processing direction, with the blade assembly being exposed to the passage so as to be engaged by the food item moved in said processing direction; and a drive assembly to drive said blade assembly along said cutting path, wherein the blade assembly includes a blade carrier adapted to hold a blade and a blade cartridge having a support surface for the food item, the blade carrier being moveable along the cutting path, wherein the blade is moveably mounted in the blade carrier and moveable with respect to the blade carrier along the processing direction such that the blade moves along the processing direction whilst the blade carrier moves along the cutting path, and wherein the blade cartridge includes a plurality of articulated links to enable curvilinear movement of the blade cartridge.

* * * * *